United States Patent
Takla et al.

(10) Patent No.: US 12,549,448 B2
(45) Date of Patent: Feb. 10, 2026

(54) SYSTEMS AND METHODS FOR FRAGMENTATION AND REASSEMBLY OF PACKETS IN A SIMULATION ENVIRONMENT

(71) Applicant: Verizon Patent and Licensing Inc., Basking Ridge, NJ (US)

(72) Inventors: Mourad B. Takla, Hillsborough, NJ (US); Xiong Yang, Berkeley Heights, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 378 days.

(21) Appl. No.: 18/191,633

(22) Filed: Mar. 28, 2023

(65) Prior Publication Data

US 2024/0333599 A1    Oct. 3, 2024

(51) Int. Cl.
*H04L 41/14* (2022.01)
*H04L 45/7453* (2022.01)
*H04W 28/06* (2009.01)

(52) U.S. Cl.
CPC ........ *H04L 41/145* (2013.01); *H04L 45/7453* (2013.01); *H04W 28/065* (2013.01)

(58) Field of Classification Search
None
See application file for complete search history.

(56) References Cited

U.S. PATENT DOCUMENTS

| | | | |
|---|---|---|---|
| 9,172,659 B1 * | 10/2015 | Roitshtein | H04L 49/10 |
| 9,510,363 B2 * | 11/2016 | Goteti | H04W 72/1268 |
| 11,082,340 B2 * | 8/2021 | Kitazato | H04L 69/22 |
| 11,082,408 B2 * | 8/2021 | Jones | H04L 63/0471 |
| 2016/0100421 A1 * | 4/2016 | Ding | H04L 1/1628 370/336 |
| 2016/0295457 A1 * | 10/2016 | Zhou | H04W 28/065 |
| 2019/0140967 A1 * | 5/2019 | Deval | H04L 69/22 |
| 2019/0141572 A1 * | 5/2019 | Zaks | H04W 12/106 |
| 2020/0007161 A1 * | 1/2020 | Dikarev | H03M 13/6362 |
| 2020/0228949 A1 * | 7/2020 | Bharadwaj | H04L 5/0044 |
| 2022/0329354 A1 * | 10/2022 | Zhou | H04L 43/0829 |
| 2022/0342554 A1 * | 10/2022 | Chen | G06F 3/0673 |
| 2023/0102614 A1 * | 3/2023 | Mitra | H04L 69/22 709/224 |
| 2024/0064569 A1 * | 2/2024 | Baddeley | H04W 72/0453 |
| 2024/0146803 A1 * | 5/2024 | Xu | H04L 47/2416 |
| 2024/0195513 A1 * | 6/2024 | Mendel | H04B 11/00 |
| 2025/0286926 A1 * | 9/2025 | Yan | H04L 67/1097 |

\* cited by examiner

*Primary Examiner* — Mariela Vidal Carpio

(57) ABSTRACT

In some implementations, a first device associated with a wireless simulation environment may detect that a packet is associated with a packet size that exceeds a threshold. The first device may perform a fragmentation of the packet by splitting the packet into a plurality of sub-packets. The first device may insert a header for each sub-packet that indicates quality of service (QOS) information associated with the packet and an allowed time for reassembling the packet. The first device may transmit each sub-packet of the plurality of sub-packets. A second device associated with the wireless simulation environment may receive each sub-packet of the plurality of sub-packets. The second device may perform a reassembly of the plurality of sub-packets to obtain the packet.

20 Claims, 10 Drawing Sheets

SYSTEMS AND METHODS FOR FRAGMENTATION AND REASSEMBLY OF PACKETS IN A SIMULATION ENVIRONMENT

BACKGROUND

Network simulation may be used to replicate a behavior of a wireless network. Network simulation may be used to analyze interactions between different network entities, such as nodes, access points, and so on, to assess a performance of the wireless network under different operating conditions. Network simulation may be used to assess a wireless network performance, identify potential problems, and/or resolve problems prior to a deployment of the wireless network.

DETAILED DESCRIPTION OF EXAMPLE EMBODIMENTS

Figure 1:
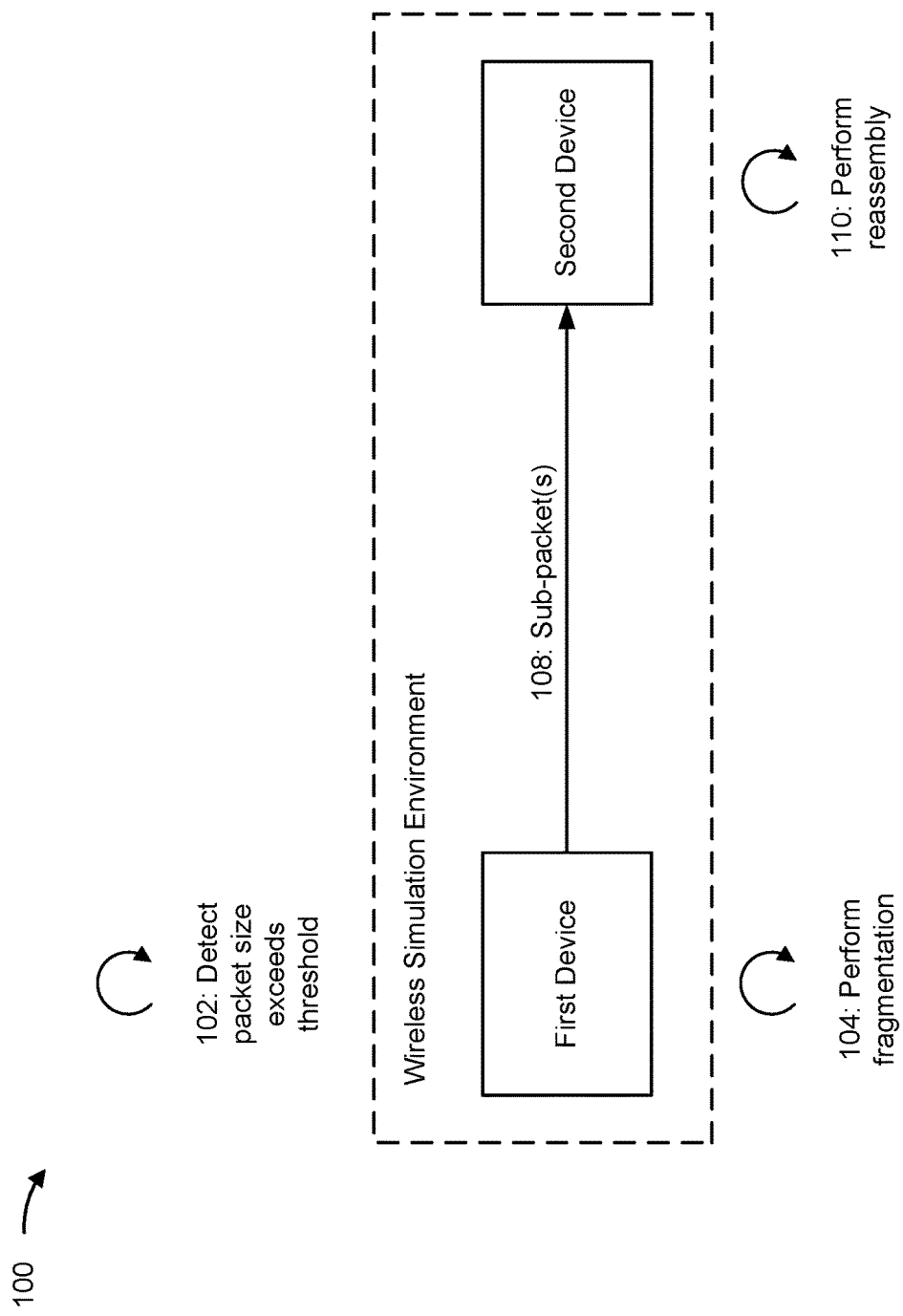
FIGS. 1-7 are diagrams of an example associated with a fragmentation and/or a reassembly of packets in a simulation environment.

The following detailed description of example implementations refers to the accompanying drawings. The same reference numbers in different drawings may identify the same or similar elements.

An end-to-end real time simulation environment may be used to simulate network traffic, such as Fifth Generation (5G) network traffic. A real time 5G simulator may be associated with real time traffic. Real time (RT) traffic may be associated with a delay window, which may be calculated using a sub-channel spacing. A value for the delay window may range from 1 millisecond (ms) to 125 microseconds. Real time traffic may be associated with various telecommunication data channels that carry user data or certain signaling messages. The real time 5G simulator may be associated with fast data traffic, which may have a delay requirement of between 1 to 100 ms. Fast data (FD) traffic may be associated with periodic telecommunication messages and non-telecommunication control messages that are required for the operation of the real time 5G simulator. The real time 5G simulator may be associated with low priority (LP) data traffic, which may have a delay requirement of more than 100 ms. Low priority data traffic may be associated with operation messages for 5G simulation, such as operational messages related to configuration and/or logging. In some cases, whether a packet is dropped may depend on whether the packet is associated with real time traffic, fast data traffic, or low priority data traffic.

In a real time 5G simulation, a packet may be generated by a network node to be transmitted in a downlink direction, or the packet may be generated by a UE to be transmitted in an uplink direction. For example, when using a data plane development kit (DPDK), an approximately 64 kilobyte (kB) packet may be managed by the DPDK to be transmitted based on a maximum transmission unit (MTU) size set by a network, where the MTU size may typically be set to approximately 1500 bytes. Existing off-the-shelf real time simulators for network traffic may only support approximately 64 KB packets. However, building an end-to-end real time simulator for 5G traffic may require packet transmissions that exceed 100 kB. In a real time 5G simulation, relatively large packets (e.g., packets much larger than approximately 64 KB) may be generated by the network node and/or the UE. In these cases, the existing off-the-shelf real time simulators for network traffic may not be useful.

In some implementations described herein, a fragmentation and reassembly for packets in a 5G real time simulation environment may be defined. The 5G real time simulation environment may be a wired simulation environment. For a packet that exceeds a threshold (e.g., 64 KB), a first device associated with the fragmentation may split the packet into one or more sub-packets. For example, a sub-packet of the one or more sub-packets may be associated with a size of 64 kB or less. The first device may mark each sub-packet with an identifier. The first device may include quality of service (QOS) information in each sub-packet, which may assist to prioritize the delivery of the sub-packet. The first device may add, for each sub-packet, a timer, which may be dependent on a traffic type associated with the sub-packet, a sub-channel spacing associated with the sub-packet, and an amount of time allocated for the fragmentation and the reassembly. The first device may transmit the one or more sub-packets using lower-level software. A second device associated with the reassembly may ensure that the one or more sub-packets (e.g., all of the sub-packets) are received in order and within an allocated time.

In some implementations, with a mix of traffic types, a fragmentation and reassembly of a relatively large packet may be achieved in real time within a strict reassembly time, which may be especially useful because wireless traffic may have strict delay sensitivity from when the packet is generated on one side until the packet is consumed on the other side. Different reassembly windows may be allowed depending on the traffic type and the client. The fragmentation and the reassembly may work with or without other off-the-shelf packages to segment relatively large packets to a reduced size (e.g., a reduced size of approximately 64 kB). The fragmentation and the reassembly may be a high layer fragmentation and reassembly that is tailored for 5G network traffic (e.g., wireless data) between devices (e.g., servers) in the 5G real time simulation environment. As a result, the fragmentation and reassembly of relatively large packets may be achieved in the 5G real time simulation environment, which may be used to accurately model relatively large packet sizes associated with 5G network traffic.

FIG. 1 is a diagram of an example 100 associated with a fragmentation and a reassembly of packets in a wireless simulation environment. As shown in FIG. 1, example 100 includes a first device (e.g., first device 810 of FIG. 8) and a second device (e.g., second device 820 of FIG. 8). The first device may be associated with a packet fragmentation in the wireless simulation environment. The second device may be associated with a packet reassembly in the wireless simulation environment. The first device may be a transmitting device, and the second device may be a receiving device. The first device may be a first server, and the second device may be a second server. Alternatively, a transmit component of a device may be associated with the packet fragmentation in the wireless simulation environment, and a receive component of the device may be associated with the packet reassembly in the wireless simulation environment.

As shown by reference number 102, the first device may detect that a packet is associated with a packet size that exceeds a threshold. The packet may be associated with an application that runs on the first device. As an example, the threshold may be set to 64 KB. The packet may have a packet size of 100 kB or more, which may be based on the packet being associated with 5G network traffic.

As shown by reference number 104, the first device may perform a fragmentation of the packet by splitting the packet into a plurality of sub-packets. Each sub-packet of the plurality of sub-packets may have a size that does not exceed the threshold. A sub-packet may also be referred to as a fragment. Given a maximum size (MAX_Sz) of allowed packets, for each packet, when a packet size (Packet_SZ) associated with the packet is greater than MAX_Sz, the first device may fragment the packet into sub-packets in accordance with $$M = \left\lceil \frac{\text{Packet\_Sz}}{\text{Max\_sz}} \right\rceil$$

(ceiling function), where M is the number of sub-packets.

Figure 3:
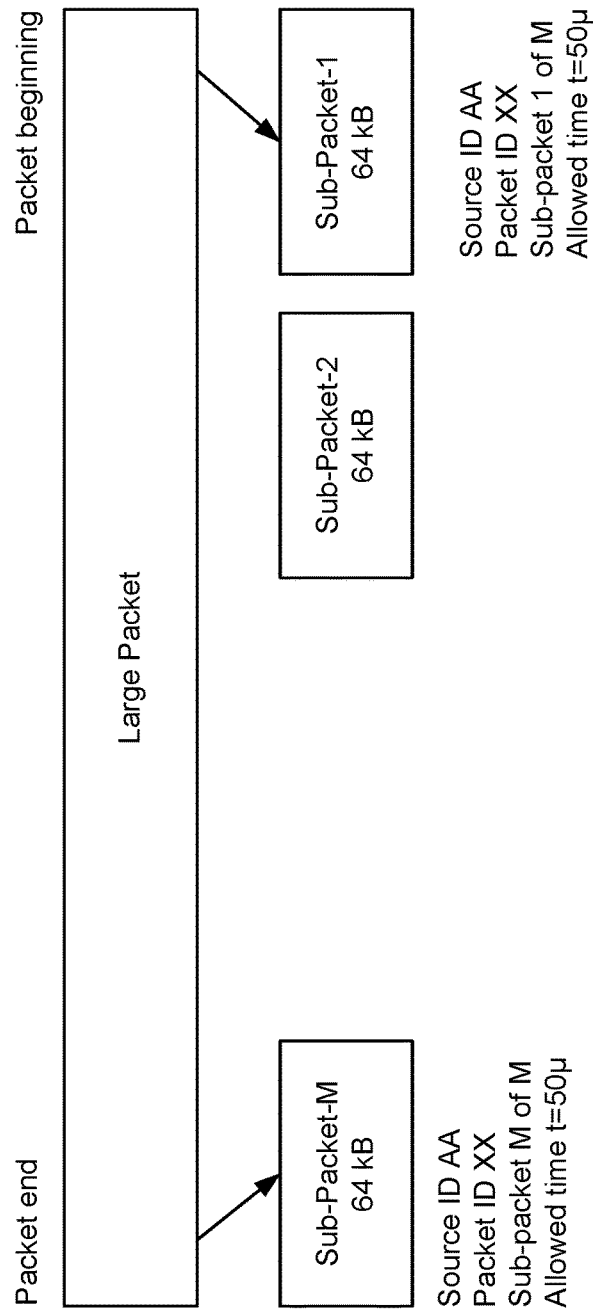

As shown by reference number 106, the first device may insert a header for each sub-packet that indicates QoS information associated with the packet and an allowed time for reassembling the packet. The QoS information may assist with prioritizing a delivery of the packet. The allowed time for reassembling the packet may be based on a traffic type and a sub-channel spacing. The header may indicate, for the sub-packet, a source identifier (ID), a packet ID, and a control word that indicates the QoS information. The control word may indicate a sub-packet ID, a total number of sub-packets, the traffic type, and a priority within the traffic type. The traffic type may be one of real time traffic, fast data traffic, or low latency data traffic. The source ID may be associated with a transmitting component and may assist to uniquely identify the packet. The source ID may assist with identifying a source of packet drops or delayed packets. The packet ID may be used in combination with the source ID to indicate that the sub-packet is associated with the packet. The packet ID may be generated per application or per server. An example of the fragmentation and associated header information is shown in FIG. 3.

In some implementations, each sub-packet may be indexed based on its location within the packet (e.g., an original packet). A sub-packet 1 may correspond to a beginning portion of the packet, and a sub-packet M may correspond to a last portion of the packet. For each subpacket, the first device may insert the header. The header may indicate the source ID (uint32, which may correspond to a 32-bit unsigned integer). The header may indicate the packet ID (uint32). The header may indicate the control word. The control word may indicate a sub-packet ID (uint8, which may correspond to an 8-bit unsigned integer). The control word may indicate the total number of sub-packets (M) (uint8). The control word may indicate the traffic type, such as real time traffic, fast data traffic, or low priority data traffic (uint8, where 1=RT, 2=FD, 4=LP, and others are reserved). The control word may indicate priority within the traffic type (uint8, where 0 is a highest priority, 1 is a medium priority, and 3 is a lower priority). The header may indicate the allowed time to reassemble the sub-packets (uint32 value in microseconds).

In some implementations, the source ID may be a transmitting component ID, such as a radio access network (RAN) ID or a UE ID. The source ID may be unique to help identify the packet. The source ID may be used to assist a network with debugging. The source ID may help identify the source of packet drops or delayed packets. The transmitting component ID may help with identifying a source and a path of the packet more precisely. In some implementations, the packet ID may be an ID associated with the packet, which may be used in combination with the source ID to indicate which sub-packets are associated with the packet. The packet ID may be generated per application or per server. When the same source is transmitting different packets via different topics, each packet may have a different packet ID. In some implementations, the control word may include fragment information, which may indicate the fragment ID and the total number of sub-packets. The control word may include priority information and QoS information, which may include the traffic type (e.g., real time traffic, fast data traffic, or low priority data traffic), or the priority within the traffic type (e.g., 0 to 9, where 0 is the highest priority and 9 is the lowest priority). A first half of the control word, which may correspond to the fragmentation information, may assist a system to determine which sub-packet, and the number of sub-packets, to expect. A second half of the control word, which may correspond to the priority information and the QoS information, may allow the system to prioritize packets, even within the same queue type.

In some implementations, the fragmentation may be virtual. A pointer may specify a beginning of a current sub-packet and a length field to indicate a length of the sub-packet. A second device (e.g., a receiving device) may copy that portion of data to its local memory buffer, or may operate directly on that data.

As shown by reference number 108, the first device may transmit each sub-packet of the plurality of sub-packets. The second device may receive each sub-packet of the plurality of sub-packets. The plurality of sub-packets may be transmitted and received via a wired connection or a wireless connection between the first device and the second device. In some implementations, when packets (or sub-packets) are transmitted in a transport network, the packets may be delivered in a correct order without errors. The packets may be lost or dropped. The packets may be delayed. The packets may be out of order.

Figure 4:
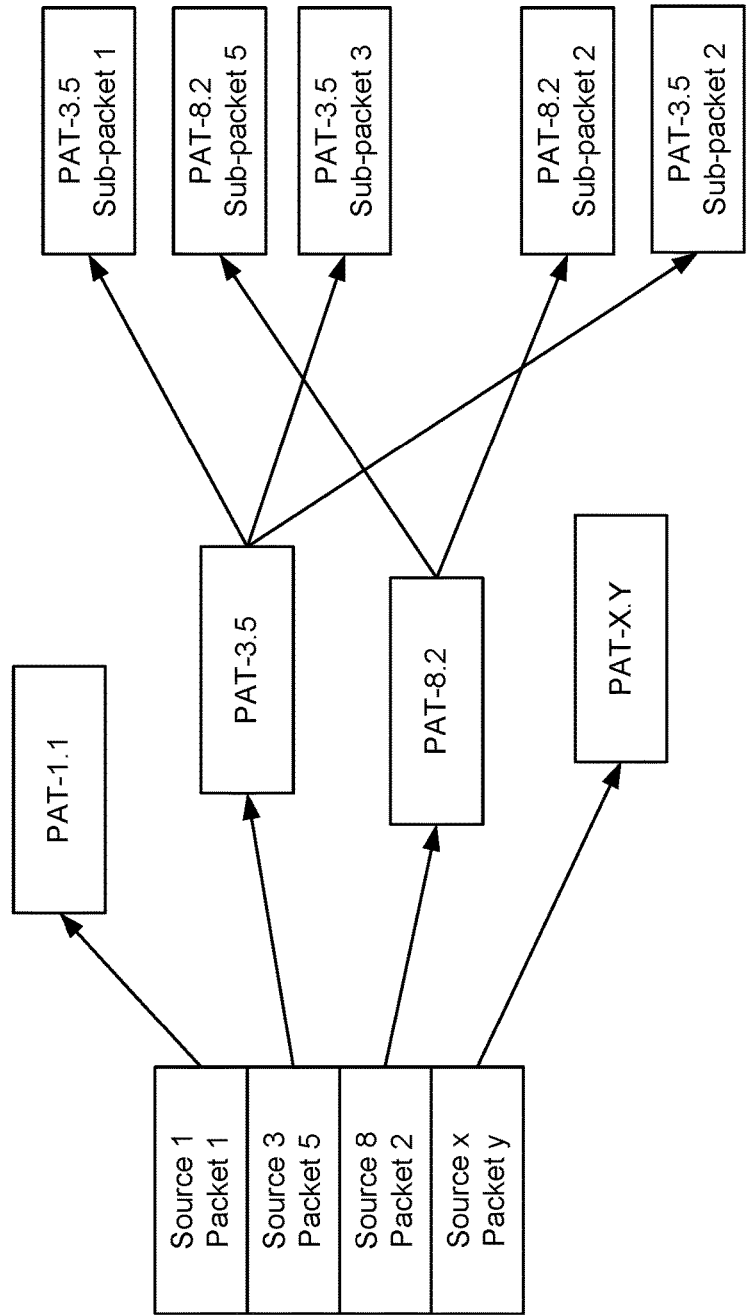

As shown by reference number 110, the second device may perform a reassembly of the plurality of sub-packets to obtain the packet that is associated with the packet size that exceeds the threshold. The reassembly may be based on a verification that the plurality of sub-packets are received in order and within the allowed time for reassembling the packet. The second device, when performing the reassembly, may generate a hash table that includes a pointer to a packet assembly table for the packet. The hash table may include a key that is based on the source ID associated with the packet and the packet ID associated with the packet. An example of the hash table is shown in FIG. 4.

In some implementations, the second device, when performing the reassembly, may receive the sub-packet, of the plurality of sub-packets, associated with the packet. The second device may identify, based on the header associated with the sub-packet, the packet assembly table for the packet. The second device may store information from the header of the sub-packet in the packet assembly table for the packet. The information from the header may indicate the packet ID, a total number associated with the plurality of sub-packets, a receive time associated with the sub-packet, and a time allowed to receive the packet. The information from the header may indicate, for the sub-packet, a sub-packet ID, whether the sub-packet is associated with an error, a pointer to a location at which the sub-packet is stored in memory, and a size of the sub-packet.

In some implementations, the second device may be associated with a reassembly area. An area of memory may be reserved to reassemble the sub-packets. The area of memory may be used to create packet assembly tables. During a reassembly, a master list of all packet assembly tables may be maintained in the hash table. The hash table may include the key based at least in part on the source ID and the packet ID. Data of the hash table may include the pointer to the packet assembly table for a given packet. For any sub-packet that is received, the reassembly may use information from the sub-packet's header to look up the packet assembly table of the given packet, and then store relevant information of the received sub-packet in the packet assembly table of that packet. The second device may create a new area for the packet assembly table once a new packet is received. The second device may claim the memory of a consumed packet, whether consumed by an application or deleted due to error.

In some implementations, in the reassembly, after receiving a first sub-packet of a packet, which may be identified by a unique packet ID, the sub-packet may be stored in a known location. Information related to the sub-packet may be kept in a table (e.g., a packet assembly table). The information may include start addresses of buffers holding the sub-packet and a sub-packet size. The table may also indicate the packet ID, a total number of sub-packets, a time at which the first sub-packet was received, and a time allowed to receive an entire packet. Further, for each sub-packet, the table may indicate the sub-packet ID, whether the sub-packet is associated with the error, the pointer to the location at which the sub-packet is stored in memory, and the size of the sub-packet. When packets are in order and without error, then sub-packets may be then copied in order to an area in which a second device may be able to receive the sub-packets. Alternatively, the second device may obtain a list of (pointer, size) values in proper order, and then operate in these buffers directly. A specification implementation of a sub-packet table or per sub-packet buffer may be developer specific.

As an example, a packet assembly table may indicate a source ID of AA, a packet ID of XX, a total number of sub-packets of M, a total allowed time of Tr microseconds, and a start time (a first sub-packet arriving). The packet assembly table may indicate, for a sub-packet 1, a status of no error, a start pointer A, and a sub-packet size. The packet assembly table may indicate, for a sub-packet 2, a status of no error, a start pointer B, and a sub-packet size.

Figure 5:
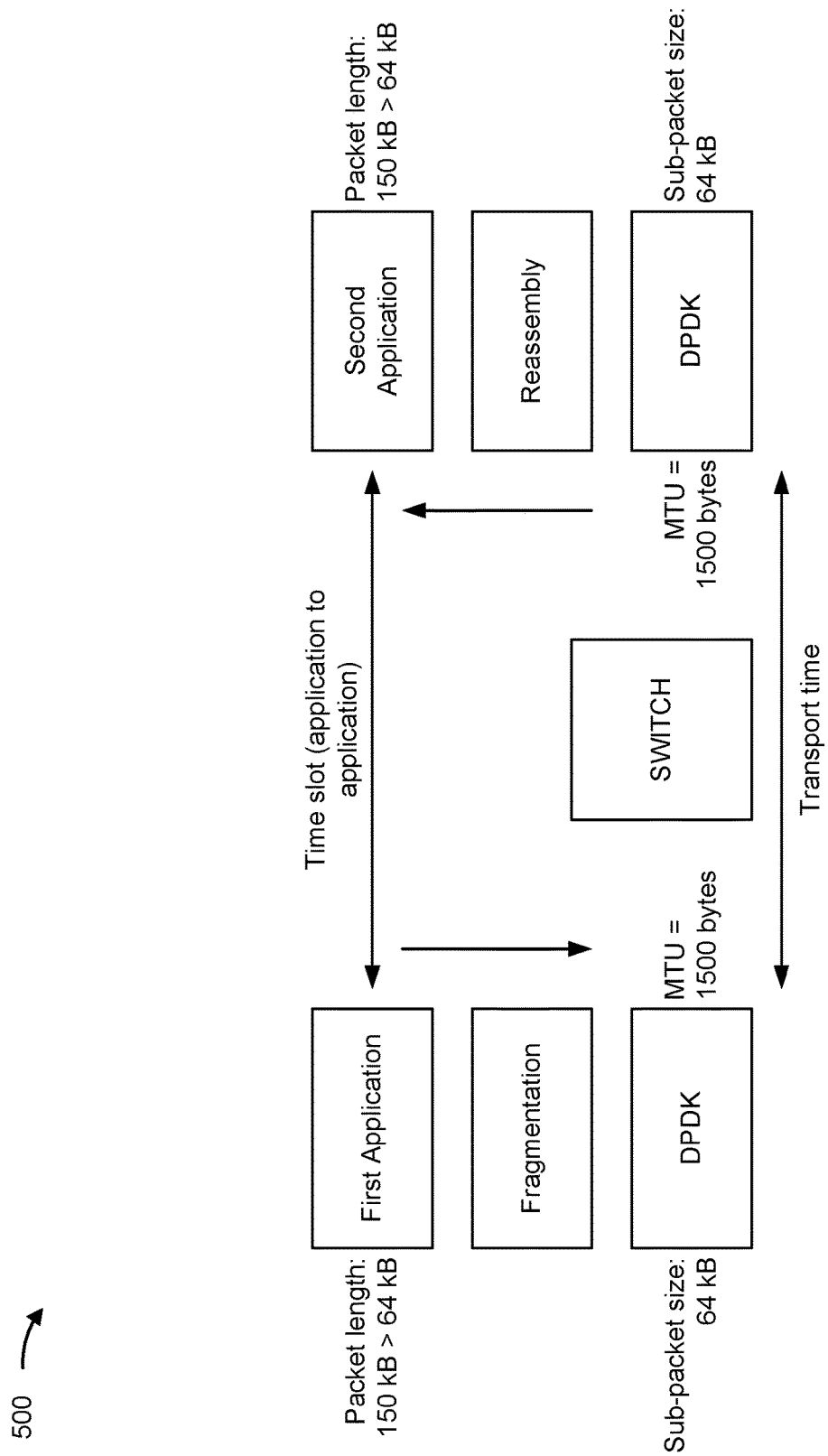

In some implementations, when the packet is transmitted from one application utilizing a simulation environment and DPDK to another application, a total time allocated for the packet may vary from a fraction of a time slot to multiple time slots. The time slot may correspond to a period for data to be transmitted from a network node to multiple UEs, or vice versa, and may be a function of a sub-channel spacing. A portion of a time slot period may be allocated to each of a fragmentation phase, a transport phase, and a reassembly phase. In some cases, processing the packet at transmit and receive stages may also be performed on the packet, which may depend on a time allocation for transmitting and receiving the packet. An example of the time slot is shown in FIG. 5.

In some implementations, the allowed time for reassembling the packet may be based on a maximum time allowed for performing the fragmentation, a transport of the plurality of sub-packets, and the reassembly. The allowed time for reassembling the packet may be based on the reassembly and not the fragmentation and the transport of the plurality of sub-packets. The allowed time for reassembling the packet may be based on a wireless channel and a percentage of a time slot used for the fragmentation and the reassembly.

Figure 6:
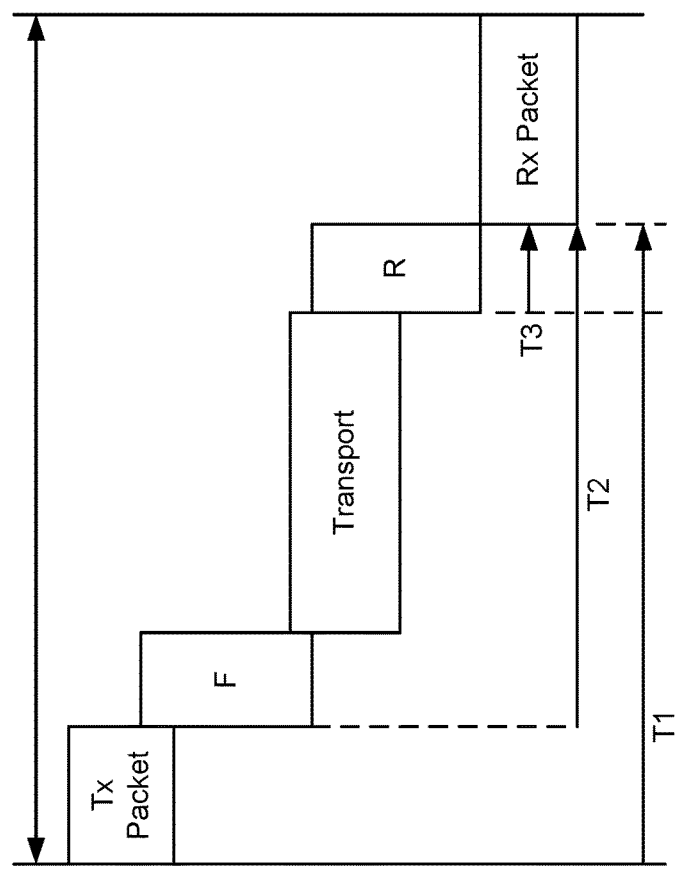

In some implementations, regarding an allocated time per sub-channel spacing for real time data, to accommodate the delivery of real time data for different sub-channel spacings, the allowed time (T1) to reassemble sub-packets from the time the sub-packets were created may be part of a header of a first sub-packet. A value for T1 may be different depending on the sub-channel spacing. In a first case, a maximum time budget (T2) may be defined to perform fragmentation and reassembly. In a second case, a time (T3) required to perform reassembly only may be defined. As a result, a second device may be able to determine an amount of time to wait to reassemble the sub-packets into a packet. Examples of T1, T2, and T3 are shown in FIG. 6.

In some implementations, each carrier may be associated with a different sub-channel spacing ($\mu$). For example, a first carrier (e.g., RANP1) may be associated with a sub-channel spacing of 500 microseconds ($\mu=1$), a second carrier (e.g., RANP2) may be associated with a sub-channel spacing of 125 microseconds ($\mu=3$), and a third carrier (e.g., RANP3) may be associated with a sub-channel spacing of 1 ms ($\mu=0$).

Figure 7:
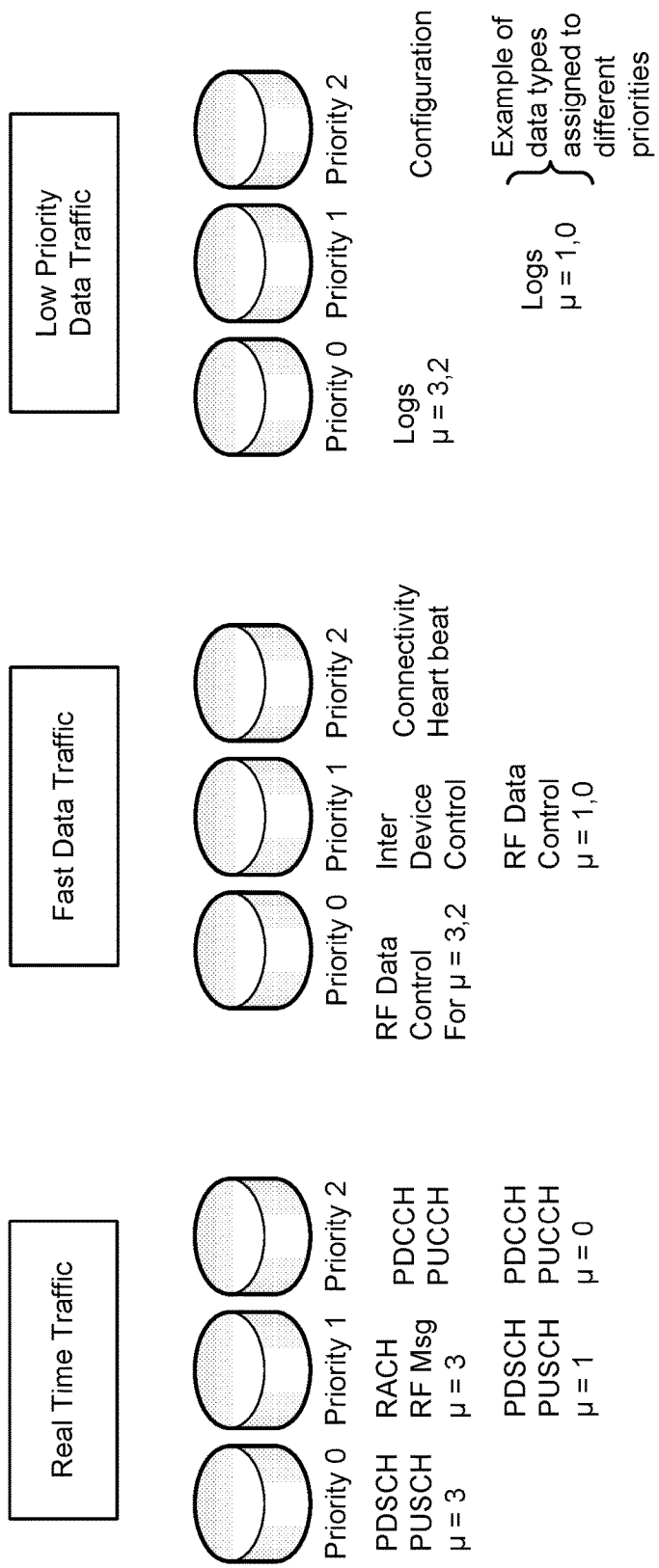

In some implementations, packets may be prioritized based on traffic type, and also within each traffic type. With each traffic type, data may again be prioritized to allow relatively large and time sensitive packets to be delivered on time, versus a relatively large number of smaller packets. An example of prioritizing packets is shown in FIG. 7.

In some implementations, a single value for an allowed time for packet reassembly may not be efficient. When dealing with traffic that requires different time slots (e.g., 1 ms down to 125 microseconds) over a transport network, a QoS assigned for certain traffic may be different to allow for the delivery of low latency traffic ahead of relatively slower traffic. An amount of time needed to reassemble packets belonging to $\mu=3$ (125 microseconds) may be less than an amount of time needed to assemble packets for $\mu=0$ (1 ms). Some traffic may require a fragmentation, transport, and/or reassembly that is a fraction of a time slot, while other traffic may utilize a full time slot. Each application may define the allowed time per packet depending on the traffic type. For example, the allowed time per packet may depend on a sub-channel spacing, the traffic type (e.g., real time traffic, fast data traffic, or low priority data traffic), a wireless channel (e.g., a PxSCH, a PxCCH, or a random access channel (RACH)), and a percentage of processing from the time slot (e.g., 100% means that a full time slot is utilized).

In some implementations, traffic may be marked with a transport priority based on the traffic type and the priority of traffic within the traffic type. For example, physical downlink shared channel (PDSCH) traffic may be prioritized ahead of RACH traffic, which may be prioritized ahead of physical downlink control channel (PDCCH) traffic, and so on. The same traffic type (e.g., PDSCH and physical uplink shared channel (PUSCH)) may have different priorities based on the sub-channel spacing, where a higher sub-channel spacing may be set with a higher priority as compared to a lower sub-channel spacing. As a result, highest priority packets may be allowed to be served first, and then lower priority packets may be served, which may provide flexibility and resiliency to deal with diverse traffic types.

In some implementations, the second device, when performing the reassembly, may start a timer after a first sub-packet, of the plurality of sub-packets, is received. The second device may determine that one or more sub-packets, of the plurality of sub-packets, are not received prior to an expiry of the timer. The second device may generate an error code based on the one or more sub-packets not being received prior to the expiry of the timer. The error code may indicate that the packet is an incomplete packet. The second device may indicate the error code to an application that runs on the second device. The second device may store the error code in a local log along with a corresponding source ID, packet ID, number of received sub-packets, and time at which the first sub-packet was received. In some implementations, the second device, when performing the reassembly, may determine that an additional sub-packet, of the plurality of sub-packets, is received after the expiry of the timer. The additional sub-packet may be a last sub-packet of the plurality of sub-packets. The second device may update the local log to indicate that the packet is a late packet rather than the incomplete packet.

In some implementations, after receiving the first sub-packet, although a sub-packet ID may not necessarily be 1, the second device may record an arrival time and a packet allowed time. A packet timer may be used to declare whether a packet duration is reached or not. When the packet allowed time is reached and not all sub-packets are delivered, the packet may be declared to be late. The error with the error code (e.g., incomplete packet) may be generated and sent to the application. The error may be kept in the local log that includes the corresponding source ID, packet ID, number of received sub-packets, and time at which the first sub-packet was received. To distinguish between the late packet and a dropped packet, the second device may monitor whether additional sub-packets are received after an allocated time, and if so, the second device may mark logs to indicate the late packet instead of an incomplete packet. When no additional sub-packets are received, the log will remain as is (e.g., incomplete packet). This approach may involve additional processing and storage, rather than simply ignoring whether the packet is dropped due to a lost fragment or a delayed delivery. A plurality of sub-packets associated with an errored packet may be deleted and only the log may be kept. A table holding information in regard to the errored packet may also be deleted.

In some implementations, the second device, when performing the reassembly, may detect that the plurality of sub-packets are received out of order. The second device may reorder the plurality of sub-packets to be in order based on sub-packet identifiers associated with the plurality of sub-packets. In some implementations, sub-packets may be delivered out of order but within an allowed time for reassembly. In this case, the second device may be responsible for reordering and/or merging the sub-packets to be in order. The second device may reorder the sub-packets by sorting content of a per packet fragment table, or by simply reading the table in the proper order. For the sub-packets to be reordered, all of the sub-packets need to be delivered within the required time period and without error.

As an example, a table may indicate a source ID AA, a packet ID XX, a total number of fragments, an allowed timer, and a start time. Further, the table may indicate an ordering of a sub-packet 2, a sub-packet 1, a sub-packet 4, and a sub-packet 3. The second device may read the table, or sort the content in the table, such that the ordering corresponds to the sub-packet 1, the sub-packet 2, the sub-packet 3, and the sub-packet 4.

In some implementations, the second device, when performing the reassembly, may receive sub-packets associated with multiple packets in a multiplexed manner. The second device may perform the reassembly of multiple simultaneous packets. In some implementations, regarding late packets, allowing a per packet programmable value for a reassembly window may allow an application with a required flexibility to deal with different packets accordingly. In some implementations, when the second device is reassembling packets, sub-packets for different packets may be delivered in a multiplexed manner. The second device may support the reassembly of multiple simultaneous packets, when receiving the multiple simultaneous packets.

In some implementations, the first device may include QoS information in the packet to help prioritize the delivery of the packet, where the QoS information may be associated with the traffic type and the priority within the traffic type. For example, real time traffic may be prioritized over low priority data traffic. Packets even within the same queue type may be prioritized based on the QoS information associated with the packet. Further, the reassembly may be associated with a reassembly time window, which may depend on the traffic type. As a result, in a 5G real time simulation environment, relatively large packets may be fragmented and reassembled in accordance with a strict reassembly time, which may improve an overall system performance.

As indicated above, FIG. 1 is provided as an example. Other examples may differ from what is described with regard to FIG. 1. The number and arrangement of devices shown in FIG. 1 are provided as an example. In practice, there may be additional devices, fewer devices, different devices, or differently arranged devices than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

Figure 2:
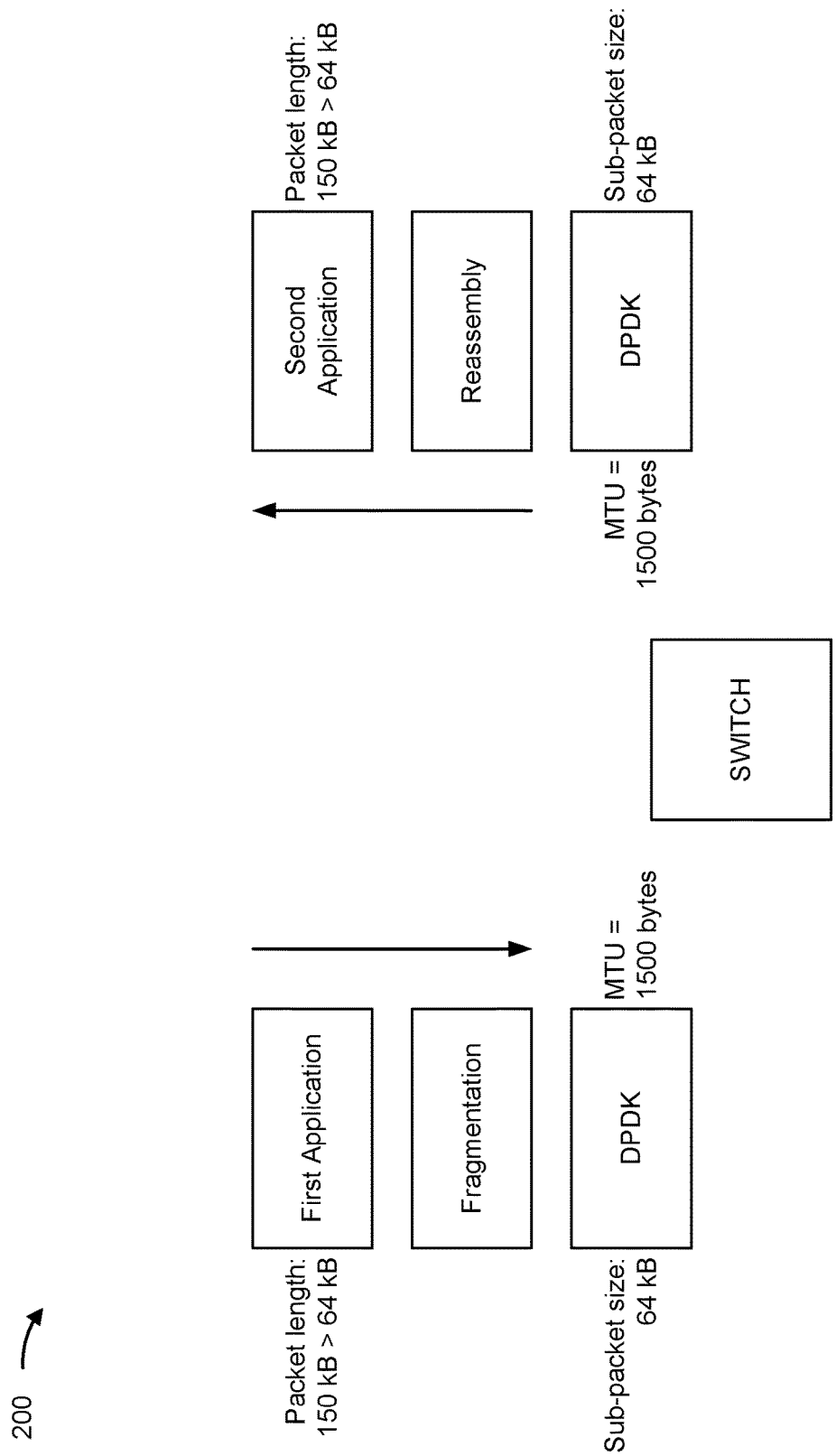

FIG. 2 is a diagram of an example 200 associated with a fragmentation and a reassembly of packets in a simulation environment.

As shown in FIG. 2, at a first device, a first application may be associated with a packet having a packet length that is greater than a threshold. For example, the packet length may be 150 kB, and the threshold may be 64 KB. After a fragmentation of the packet, when using DPDK, a sub-packet size may be 64 kB or less, and may be associated with an MTU size of approximately 1500 bytes. At a second device, using DPDK, a sub-packet size may be 64 kB or less, and may be associated with the MTU size of approximately 1500 bytes. After a reassembly associated with the sub-packet, a packet may have the packet length that is greater than the threshold. For example, the packet length may be 150 kB, and the threshold may be 64 KB. The packet may be consumed by a second application.

As indicated above, FIG. 2 is provided as an example. Other examples may differ from what is described with regard to FIG. 2.

FIG. 3 is a diagram of an example 300 associated with fragmentation of packets in a simulation environment.

As shown in FIG. 3, a relatively large packet may be associated with a beginning and an end. The relatively large packet may be split into a plurality M of sub-packets (or fragments), such as sub-packet-1, sub-packet-2, and so on until sub-packet-M. The plurality of sub-packets may each be associated with the same source ID (e.g., source ID AA). The plurality of sub-packets may each be associated with the same packet ID (e.g., packet ID XX). The plurality of sub-packets may each be associated with the same allowed time (e.g., t=50 μsec). A first sub-packet, of the plurality of sub-packets, may be sub-packet 1 of the M sub-packets. A last sub-packet, of the plurality of sub-packets, may be sub-packet M of the M sub-packets. DPDK may be used to transmit the 64 KB sub-packets based at least in part on an MTU size.

As indicated above, FIG. 3 is provided as an example. Other examples may differ from what is described with regard to FIG. 3.

FIG. 4 is a diagram of an example 400 associated with a fragmentation and a reassembly of packets in a simulation environment.

As shown in FIG. 4, a master table may hold a pointer to a packet assembly table (PAT) for each packet. The master table may indicate a first key, which may be associated with source ID 1 and packet ID 1. The master table may indicate a second key, which may be associated with source ID 3 and packet ID 5. The master table may indicate a third key, which may be associated with source ID 8 and packet ID 2. The master table may indicate a fourth key, which may be associated with source ID x and packet ID y. The second key may be associated with a sub-packet 1, a sub-packet 3, and a sub-packet 2. The third key may be associated with a sub-packet 5 and a sub-packet 2.

As indicated above, FIG. 4 is provided as an example. Other examples may differ from what is described with regard to FIG. 4.

FIG. 5 is a diagram of an example 500 associated with a fragmentation and a reassembly of packets in a simulation environment.

As shown in FIG. 5, at a first device, a first application may be associated with a packet having a packet length that is greater than a threshold. For example, the packet length may be 150 kB, and the threshold may be 64 KB. After a fragmentation of the packet, when using DPDK, a sub-packet size may be 64 KB or less, and may be associated with an MTU size of approximately 1500 bytes. At a second device, using DPDK, a sub-packet size may be 64 KB or less, and may be associated with the MTU size of approximately 1500 bytes. After a reassembly associated with the sub-packet, a packet may have the packet length that is greater than the threshold. For example, the packet length may be 150 kB, and the threshold may be 64 kB. The packet may be consumed by a second application. A time slot may correspond to a time at which the packet is available at the first application and at which the packet is available at the second application. The time slot may refer to an application-to-application time period. A transport time may correspond to a time at which a sub-packet is transmitted from the first device to the second device.

As indicated above, FIG. 5 is provided as an example. Other examples may differ from what is described with regard to FIG. 5.

FIG. 6 is a diagram of an example 600 associated with a fragmentation and a reassembly of packets in a simulation environment.

As shown in FIG. 6, a time T1 may indicate a maximum amount of time allowed for a fragmentation, a transport, and a reassembly of sub-packets associated with a packet, starting from a time at which the sub-packets were created. A time T2 may indicate a maximum amount of time allowed for the fragmentation, the transport, and the reassembly. The time T2 may indicate a maximum allowed delay from a transmit data creation. A time T3 may indicate a maximum amount of time allowed only for reassembly. A duration of a time slot may involve the transmit data creation, the fragmentation, the transport, the reassembly, and a receive data creation.

As indicated above, FIG. 6 is provided as an example. Other examples may differ from what is described with regard to FIG. 6.

FIG. 7 is a diagram of an example 700 associated with a fragmentation and a reassembly of packets in a simulation environment.

As shown in FIG. 7, for real time traffic, priority 0 may be associated with a PDSCH and a PUSCH, with $\mu=3$. Priority 1 may be associated with RACH radio frequency (RF) messages, with $\mu=3$. Priority 1 may be associated with a PDSCH and a PUSCH, with $\mu=1$. Priority 3 may be associated with a PDCCH and a physical uplink control channel (PUCCH). Priority 3 may be associated with a PDSCH and a PUSCH, with $\mu=0$. For fast data traffic, priority 0 may be associated with RF data control, for $\mu=3,2$. Priority 1 may be associated with inter device control. Priority 1 may be associated with RF data control, for $\mu=1,0$. Priority 3 may be associated with connectivity messages and heartbeat messages. For low priority data traffic, priority 0 may be associated with logs $\mu=3,2$. Priority 1 may be associated with logs $\mu=1,0$. Priority 3 may be associated with a configuration. As a result, various data types may be assigned to different priorities.

As indicated above, FIG. 7 is provided as an example. Other examples may differ from what is described with regard to FIG. 7.

Figure 8:
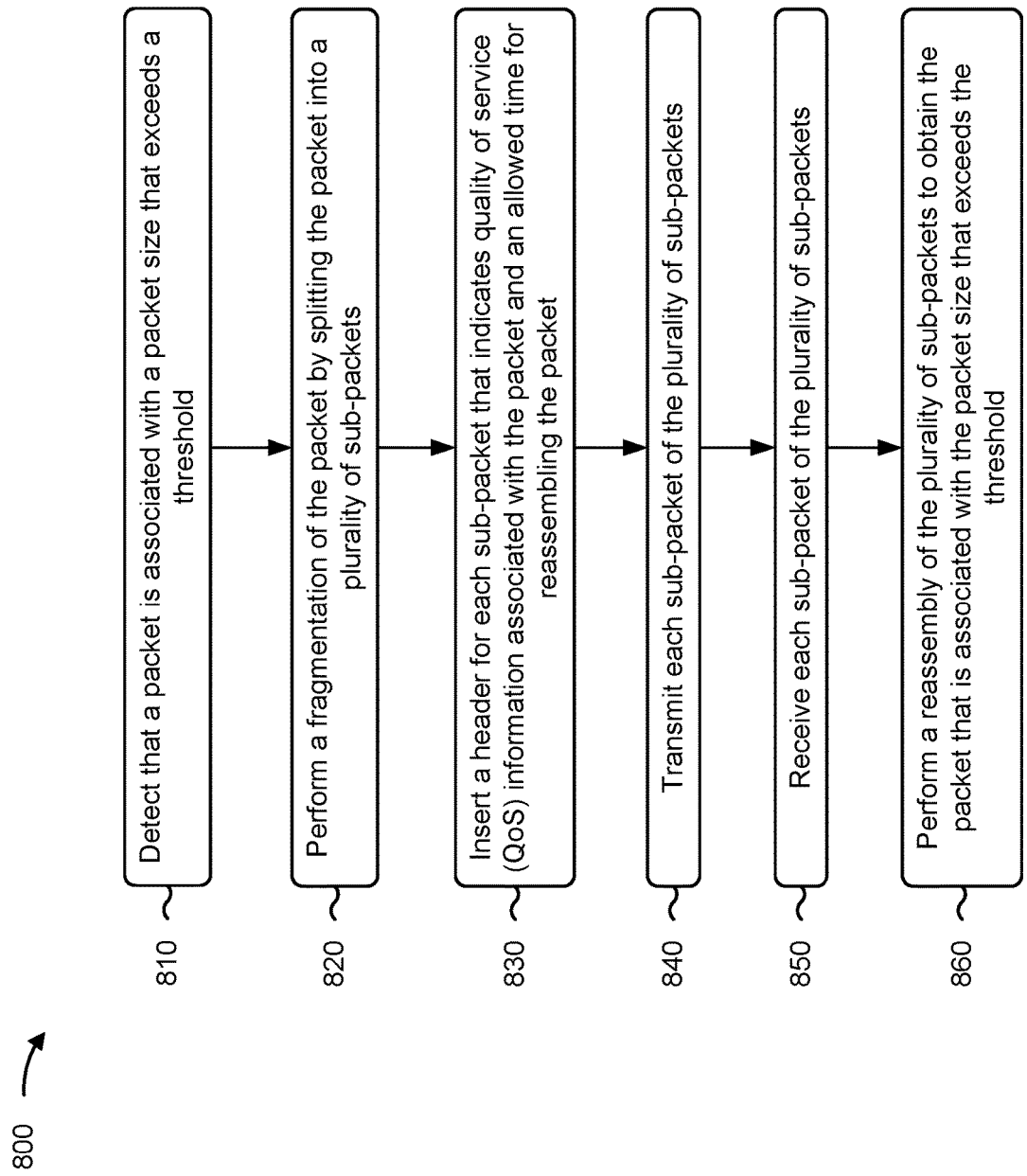
FIG. 8 is a diagram of an example environment in which systems and/or methods described herein may be implemented.

FIG. 8 is a flowchart of an example process 800 associated with a fragmentation and a reassembly of packets in a simulation environment. In some implementations, one or more process blocks of FIG. 8 may be performed by a first device (e.g., first device 910) of a wireless simulation environment or a second device (e.g., second device 920) of the wireless simulation environment. The first device may be associated with a packet fragmentation in the wireless simulation environment, and the second device may be associated with a packet reassembly in the wireless simulation environment. Additionally, or alternatively, one or more process blocks of FIG. 8 may be performed by one or more components of device 1000, such as processor 1020, memory 1030, input component 1040, output component 1050, and/or communication component 1060.

As shown in FIG. 8, process 800 may include detecting that a packet is associated with a packet size that exceeds a threshold (block 810). For example, the first device associated with the wireless simulation environment may detect that a packet is associated with a packet size that exceeds a threshold, as described above.

As further shown in FIG. 8, process 800 may include performing a fragmentation of the packet by splitting the packet into a plurality of sub-packets, wherein each sub-packet of the plurality of sub-packets has a size that does not exceed the threshold (block 820). For example, the first device associated with the wireless simulation environment may perform a fragmentation of the packet by splitting the packet into a plurality of sub-packets, wherein each sub-packet of the plurality of sub-packets has a size that does not exceed the threshold, as described above.

As further shown in FIG. 8, process 800 may include inserting a header for each sub-packet that indicates QoS information associated with the packet and an allowed time for reassembling the packet, wherein the QoS information assists with prioritizing a delivery of the packet, and wherein the allowed time for reassembling the packet is based on a traffic type and a sub-channel spacing (block 830). For example, the first device associated with the wireless simulation environment may insert a header for each sub-packet that indicates QoS information associated with the packet and an allowed time for reassembling the packet, wherein the QoS information assists with prioritizing a delivery of the packet, and wherein the allowed time for reassembling the packet is based on a traffic type and a sub-channel spacing, as described above.

In some implementations, the header may indicate, for the sub-packet, a source ID, a packet ID, and a control word that indicates the QoS information. The control word may indicate a sub-packet ID, a total number of sub-packets, the traffic type, and a priority within the traffic type. The traffic type may be one of real time traffic, fast data traffic, or low latency data traffic. The source ID may be associated with a transmitting component and may assist to uniquely identify the packet. The source ID may assist with identifying a source of packet drops or delayed packets. The packet ID may be used in combination with the source ID to indicate that the sub-packet is associated with the packet. The packet ID may be generated per application or per server.

As further shown in FIG. 8, process 800 may include transmitting each sub-packet of the plurality of sub-packets (block 840). For example, the first device associated with the wireless simulation environment may transmit each sub-packet of the plurality of sub-packets, as described above.

As further shown in FIG. 8, process 800 may include receiving each sub-packet of the plurality of sub-packets (block 850). For example, the second device associated with the wireless simulation environment may receive each sub-packet of the plurality of sub-packets, as described above.

As further shown in FIG. 8, process 800 may include performing a reassembly of the plurality of sub-packets to obtain the packet that is associated with the packet size that exceeds the threshold, wherein the reassembly is based on a verification that the plurality of sub-packets are received in order and within the allowed time for reassembling the packet (block 860). For example, the second device associated with the wireless simulation environment may perform a reassembly of the plurality of sub-packets to obtain the packet that is associated with the packet size that exceeds the threshold, wherein the reassembly is based on a verification that the plurality of sub-packets are received in order and within the allowed time for reassembling the packet, as described above.

In some implementations, the second device, when performing the reassembly, may generate a hash table that includes a pointer to a packet assembly table for the packet. The hash table may include a key that is based on a source ID associated with the packet and the packet ID associated with the packet. In some implementations, the second device, when performing the reassembly, may receive the sub-packet, of the plurality of sub-packets, associated with the packet. The second device may identify, based on the header associated with the sub-packet, the packet assembly table for the packet. The second device may store information from the header of the sub-packet in the packet assembly table for the packet. The information from the header may indicate the packet ID, a total number associated with the plurality of sub-packets, a receive time associated with the sub-packet, and a time allowed to receive the packet. The information from the header may indicate, for the sub-packet, a sub-packet ID, whether the sub-packet is associated with an error, a pointer to a location at which the sub-packet is stored in memory, and a size of the sub-packet.

In some implementations, the allowed time for reassembling the packet may be based on a maximum time allowed for performing the fragmentation, a transport of the plurality of sub-packets, and the reassembly. In some implementations, the allowed time for reassembling the packet may be based on the reassembly and not the fragmentation and the transport of the plurality of sub-packets. In some implementations, the allowed time for reassembling the packet may be based on a wireless channel and a percentage of a time slot used for the fragmentation and the reassembly.

In some implementations, the second device, when performing the reassembly, may start a timer after a first sub-packet, of the plurality of sub-packets, is received. The second device may determine that one or more sub-packets, of the plurality of sub-packets, are not received prior to an expiry of the timer. The second device may generate an error code based on the one or more sub-packets not being received prior to the expiry of the timer. The error code may indicate that the packet is an incomplete packet. The second device may indicate the error code to an application that runs on the second device. The second device may store the error code in a local log along with a corresponding ID, packet ID, number of received sub-packets, and time at which the first sub-packet was received.

In some implementations, the second device, when performing the reassembly, may determine that an additional sub-packet, of the plurality of sub-packets, is received after the expiry of the timer. The second device may update the local log to indicate that the packet is a late packet rather than the incomplete packet. In some implementations, the second device, when performing the reassembly, may detect that the plurality of sub-packets are received out of order. The second device may reorder the plurality of sub-packets to be in order based on sub-packet identifiers associated with the plurality of sub-packets. In some implementations, the second device, when performing the reassembly, may receive sub-packets associated with multiple packets in a multiplexed manner, and perform the reassembly of multiple simultaneous packets.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

Figure 9:
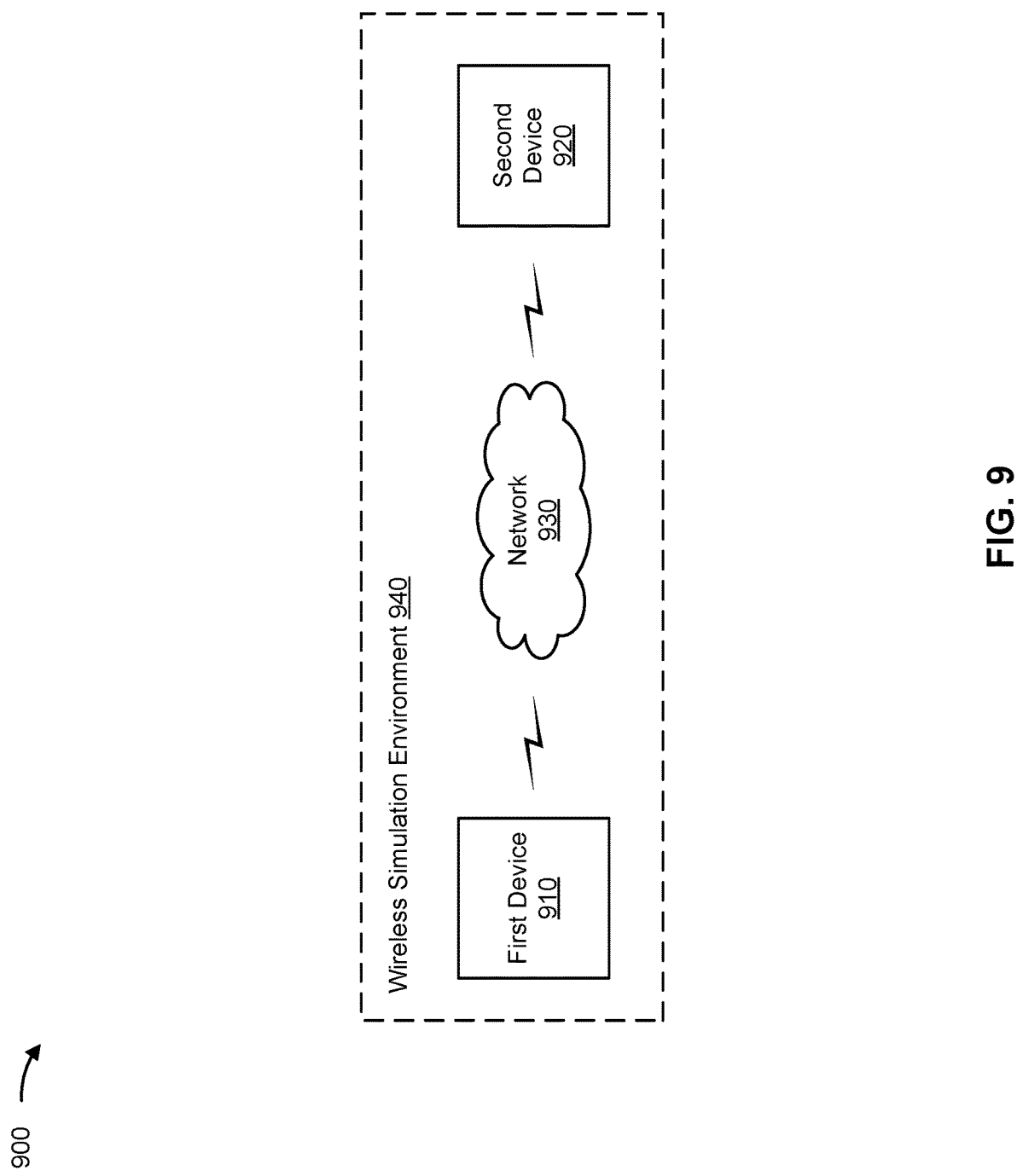
FIG. 9 is a diagram of example components of one or more devices of FIG. 8.

FIG. 9 is a diagram of an example environment 900 in which systems and/or methods described herein may be implemented. As shown in FIG. 9, environment 900 may include a first device 910, a second device 920, and a network 930. The first device 910, the second device 920, and the network 930 may be included in a wireless simulation environment 940. Devices of environment 900 may interconnect via wired connections, wireless connections, or a combination of wired and wireless connections.

The first device 910 may include one or more devices capable of receiving, generating, storing, processing, providing, and/or routing information associated with a fragmentation and a reassembly of packets in the wireless simulation environment 940, as described elsewhere herein. The first device 910 may include a communication device and/or a computing device. For example, the first device 910 may include a server, such as an application server, a client server, a web server, a database server, a host server, a proxy server, a virtual server (e.g., executing on computing hardware), or a server in a cloud computing system. In some implementations, the first device 910 may include computing hardware used in a cloud computing environment.

The second device 920 may include one or more devices capable of receiving, generating, storing, processing, providing, and/or routing information associated with a fragmentation and a reassembly of packets in the wireless simulation environment 940, as described elsewhere herein. The second device 920 may include a communication device and/or a computing device. For example, the second device 920 may include a server, such as an application server, a client server, a web server, a database server, a host server, a proxy server, a virtual server (e.g., executing on computing hardware), or a server in a cloud computing system. In some implementations, the second device 920 may include computing hardware used in a cloud computing environment.

The network 930 may include one or more wired and/or wireless networks. For example, the network 930 may include a cellular network (e.g., a 5G network, a fourth generation (4G) network, a Long Term Evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or a combination of these or other types of networks. The network 930 enables communication among the devices of environment 900.

The number and arrangement of devices and networks shown in FIG. 9 are provided as an example. In practice, there may be additional devices and/or networks, fewer devices and/or networks, different devices and/or networks, or differently arranged devices and/or networks than those shown in FIG. 9. Furthermore, two or more devices shown in FIG. 9 may be implemented within a single device, or a single device shown in FIG. 9 may be implemented as multiple, distributed devices. Additionally, or alternatively, a set of devices (e.g., one or more devices) of environment 900 may perform one or more functions described as being performed by another set of devices of environment 900.

Figure 10:
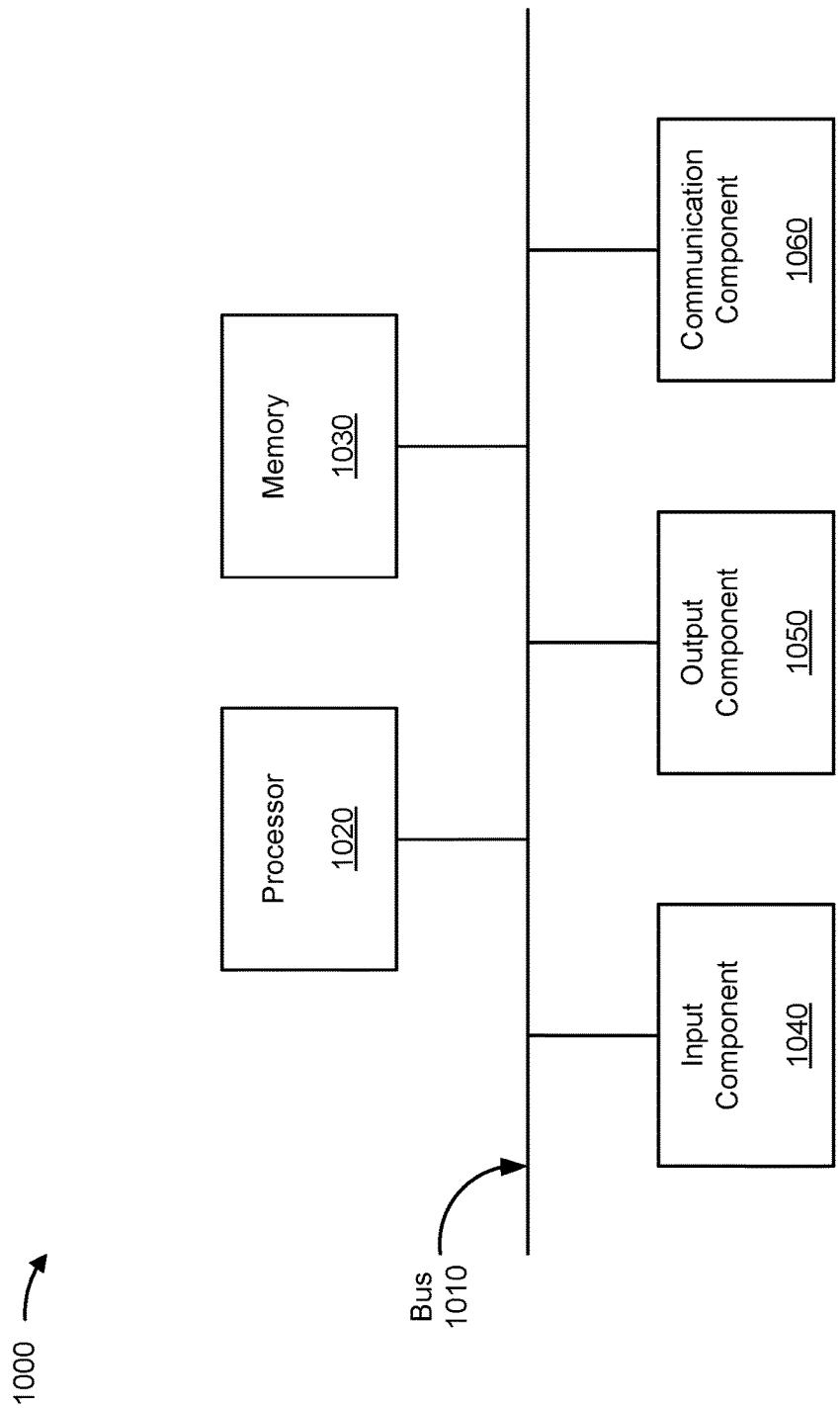
FIG. 10 is a flowchart of an example process associated with a fragmentation and/or a reassembly of packets in a simulation environment.

FIG. 10 is a diagram of example components of a device 1000 associated with a fragmentation and a reassembly of packets in a simulation environment. The device 1000 may correspond to first device 910 and/or second device 920. In some implementations, first device 910 and/or second device 920 may include one or more devices 1000 and/or one or more components of the device 1000. As shown in FIG. 10, the device 1000 may include a bus 1010, a processor 1020, a memory 1030, an input component 1040, an output component 1050, and/or a communication component 1060.

The bus 1010 may include one or more components that enable wired and/or wireless communication among the components of the device 1000. The bus 1010 may couple together two or more components of FIG. 10, such as via operative coupling, communicative coupling, electronic coupling, and/or electric coupling. For example, the bus 1010 may include an electrical connection (e.g., a wire, a trace, and/or a lead) and/or a wireless bus. The processor 1020 may include a central processing unit, a graphics processing unit, a microprocessor, a controller, a microcontroller, a digital signal processor, a field-programmable gate array, an application-specific integrated circuit, and/or another type of processing component. The processor 1020 may be implemented in hardware, firmware, or a combination of hardware and software. In some implementations, the processor 1020 may include one or more processors capable of being programmed to perform one or more operations or processes described elsewhere herein.

The memory 1030 may include volatile and/or nonvolatile memory. For example, the memory 1030 may include random access memory (RAM), read only memory (ROM), a hard disk drive, and/or another type of memory (e.g., a flash memory, a magnetic memory, and/or an optical memory). The memory 1030 may include internal memory (e.g., RAM, ROM, or a hard disk drive) and/or removable memory (e.g., removable via a universal serial bus connection). The memory 1030 may be a non-transitory computer-readable medium. The memory 1030 may store information, one or more instructions, and/or software (e.g., one or more software applications) related to the operation of the device 1000. In some implementations, the memory 1030 may include one or more memories that are coupled (e.g., communicatively coupled) to one or more processors (e.g., processor 1020), such as via the bus 1010. Communicative coupling between a processor 1020 and a memory 1030 may enable the processor 1020 to read and/or process information stored in the memory 1030 and/or to store information in the memory 1030.

The input component 1040 may enable the device 1000 to receive input, such as user input and/or sensed input. For example, the input component 1040 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 1050 may enable the device 1000 to provide output, such as via a display, a speaker, and/or a light-emitting diode. The communication component 1060 may enable the device 1000 to communicate with other devices via a wired connection and/or a wireless connection. For example, the communication component 1060 may include a receiver, a transmitter, a transceiver, a modem, a network interface card, and/or an antenna.

The device 1000 may perform one or more operations or processes described herein. For example, a non-transitory computer-readable medium (e.g., memory 1030) may store a set of instructions (e.g., one or more instructions or code) for execution by the processor 1020. The processor 1020 may execute the set of instructions to perform one or more operations or processes described herein. In some implementations, execution of the set of instructions, by one or more processors 1020, causes the one or more processors 1020 and/or the device 1000 to perform one or more operations or processes described herein. In some implementations, hardwired circuitry may be used instead of or in combination with the instructions to perform one or more operations or processes described herein. Additionally, or alternatively, the processor 1020 may be configured to perform one or more operations or processes described herein. Thus, implementations described herein are not limited to any specific combination of hardware circuitry and software.

The number and arrangement of components shown in FIG. 10 are provided as an example. The device 1000 may include additional components, fewer components, different components, or differently arranged components than those shown in FIG. 10. Additionally, or alternatively, a set of components (e.g., one or more components) of the device 1000 may perform one or more functions described as being performed by another set of components of the device 1000.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   detecting, by a first device associated with a wireless simulation environment, that a packet is associated with a packet size that exceeds a threshold;
   performing, by the first device associated with the wireless simulation environment, a fragmentation of the packet by splitting the packet into a plurality of sub-packets, wherein each sub-packet of the plurality of sub-packets has a size that does not exceed the threshold;
   inserting, by the first device associated with the wireless simulation environment, a header for each sub-packet that indicates quality of service (QOS) information associated with the packet and an allowed time for reassembling the packet, wherein the QoS information assists with prioritizing a delivery of the packet, and wherein the allowed time for reassembling the packet is based on a traffic type and a sub-channel spacing;
   transmitting, by the first device associated with the wireless simulation environment, each sub-packet of the plurality of sub-packets;
   receiving, by a second device associated with the wireless simulation environment, each sub-packet of the plurality of sub-packets; and
   performing, by the second device associated with the wireless simulation environment, a reassembly of the plurality of sub-packets to obtain the packet that is associated with the packet size that exceeds the threshold, wherein the reassembly is based on a verification that the plurality of sub-packets are received in order and within the allowed time for reassembling the packet.

2. The method of claim 1,
   wherein the first device is associated with a packet fragmentation in the wireless simulation environment and the second device is associated with a packet reassembly in the wireless simulation environment.

3. The method of claim 1,
   wherein the header indicates, for the sub-packet, a source identifier (ID), a packet ID, and a control word that indicates the QoS information, wherein the control word indicates a sub-packet ID, a total number of sub-packets, the traffic type, and a priority within the traffic type, and wherein the traffic type is one of real time traffic, fast data traffic, or low latency data traffic.

4. The method of claim 3, wherein the source ID assists to uniquely identify the packet, wherein the source ID assists with identifying a source of packet drops or delayed packets, wherein the packet ID is used in combination with the source ID to indicate that the sub-packet is associated with the packet, and wherein the packet ID is generated per application or per server.

5. The method of claim 1,
   wherein performing, by the second device associated with the wireless simulation environment, the reassembly of the plurality of sub-packets comprises:
   generating a hash table that includes a pointer to a packet assembly table for the packet, wherein the hash table includes a key that is based on a source identifier (ID) associated with the packet and a packet ID associated with the packet.

6. The method of claim 5,
wherein performing, by the second device associated with the wireless simulation environment, the reassembly of the plurality of sub-packets comprises:
receiving the sub-packet, of the plurality of sub-packets, associated with the packet;
identifying, based on the header associated with the sub-packet, the packet assembly table for the packet; and
storing information from the header of the sub-packet in the packet assembly table for the packet, wherein the information from the header indicates the packet ID, a total number associated with the plurality of sub-packets, a receive time associated with the sub-packet, and a time allowed to receive the packet, and wherein the information from the header indicates, for the sub-packet, a sub-packet ID, whether the sub-packet is associated with an error, a pointer to a location at which the sub-packet is stored in memory, and a size of the sub-packet.

7. The method of claim 1, wherein:
the allowed time for reassembling the packet is based on a maximum time allowed for performing the fragmentation, a transport of the plurality of sub-packets, and the reassembly; or
the allowed time for reassembling the packet is based on the reassembly and not the fragmentation and the transport of the plurality of sub-packets.

8. The method of claim 1,
wherein the allowed time for reassembling the packet is based on a wireless channel and a percentage of a time slot used for the fragmentation and the reassembly.

9. The method of claim 1,
wherein performing, by the second device associated with the wireless simulation environment, the reassembly of the plurality of sub-packets comprises:
starting a timer after a first sub-packet, of the plurality of sub-packets, is received;
determining that one or more sub-packets, of the plurality of sub-packets, are not received prior to an expiry of the timer;
generating an error code based on the one or more sub-packets not being received prior to the expiry of the timer, wherein the error code indicates that the packet is an incomplete packet;
indicating the error code to an application that runs on the second device; and
storing the error code in a local log along with a corresponding source identifier (ID), packet ID, number of received sub-packets, and time at which the first sub-packet was received.

10. The method of claim 9,
wherein performing, by the second device associated with the wireless simulation environment, the reassembly of the plurality of sub-packets comprises:
determining that an additional sub-packet, of the plurality of sub-packets, is received after the expiry of the timer; and
updating the local log to indicate that the packet is a late packet rather than the incomplete packet.

11. The method of claim 1,
wherein performing, by the second device associated with the wireless simulation environment, the reassembly of the plurality of sub-packets comprises:
detecting that the plurality of sub-packets are received out of order; and
reordering the plurality of sub-packets to be in order based on sub-packet identifiers associated with the plurality of sub-packets.

12. The method of claim 1,
wherein performing, by the second device associated with the wireless simulation environment, the reassembly of the plurality of sub-packets comprises:
receiving sub-packets associated with multiple packets in a multiplexed manner; and
performing the reassembly of multiple simultaneous packets.

13. A device, comprising:
a transmitter;
a receiver; and
one or more processors configured to cause the device to:
detect, in a wireless simulation environment, that a first packet is associated with a packet size that exceeds a threshold;
perform a fragmentation of the first packet by splitting the first packet into a first plurality of sub-packets, wherein each sub-packet of the first plurality of sub-packets has a size that does not exceed the threshold;
insert a header for each sub-packet that indicates quality of service (QOS) information associated with the first packet and an allowed time for reassembling the first packet, wherein the QoS information assists with prioritizing a delivery of the first packet, and wherein the allowed time for reassembling the first packet is based on a traffic type and a sub-channel spacing;
transmit, by the transmitter, each sub-packet of the first plurality of sub-packets;
receive, by a receiver of the device, each sub-packet of a second plurality of sub-packets; and
perform, by the receiver, a reassembly of the second plurality of sub-packets to obtain a second packet that is associated with the packet size that exceeds the threshold, wherein the reassembly is based on a verification that the second plurality of sub-packets are received in order and within the allowed time for reassembling the second packet.

14. The device of claim 13,
wherein the header indicates, for the sub-packet, a source identifier (ID), a packet ID, and a control word that indicates the QoS information, wherein the control word indicates a sub-packet ID, a total number of sub-packets, the traffic type, and a priority within the traffic type, and wherein the traffic type is one of real time traffic, fast data traffic, or low latency data traffic.

15. The device of claim 14,
wherein the source ID is associated with the transmitter and assists to uniquely identify the first packet, wherein the source ID assists with identifying a source of packet drops or delayed packets, wherein the packet ID is used in combination with the source ID to indicate that the sub-packet is associated with the first packet, and wherein the packet ID is generated per application or per server.

16. The device of claim 13, wherein the one or more processors, to perform the reassembly of the second plurality of sub-packets, are configured to:
generate, by the receiver, a hash table that includes a pointer to a packet assembly table for the second packet, wherein the hash table includes a key that is based on a source identifier (ID) associated with the second packet and a packet ID associated with the second packet.

17. A non-transitory computer-readable medium storing a set of instructions, the set of instructions comprising:
one or more instructions that, when executed by one or more processors of a device, cause the device to:
detect, in a wireless simulation environment, that a first packet is associated with a packet size that exceeds a threshold;
perform a fragmentation of the first packet by splitting the first packet into a first plurality of sub-packets, wherein each sub-packet of the first plurality of sub-packets has a size that does not exceed the threshold;
insert a header for each sub-packet that indicates quality of service (QOS) information associated with the first packet and an allowed time for reassembling the first packet, wherein the QoS information assists with prioritizing a delivery of the first packet, and wherein the allowed time for reassembling the first packet is based on a traffic type and a sub-channel spacing;
transmit each sub-packet of the first plurality of sub-packets;
receive each sub-packet of a second plurality of sub-packets; and
perform a reassembly of the second plurality of sub-packets to obtain a second packet that is associated with the packet size that exceeds the threshold, wherein the reassembly is based on a verification that the second plurality of sub-packets are received in order and within the allowed time for reassembling the second packet.

18. The non-transitory computer-readable medium of claim 17,
wherein the header indicates, for the sub-packet, a source identifier (ID), a packet ID, and a control word that indicates the QoS information, wherein the control word indicates a sub-packet ID, a total number of sub-packets, the traffic type, and a priority within the traffic type, and wherein the traffic type is one of real time traffic, fast data traffic, or low latency data traffic.

19. The non-transitory computer-readable medium of claim 18, wherein the source ID assists to uniquely identify the first packet, wherein the source ID assists with identifying a source of packet drops or delayed packets, wherein the packet ID is used in combination with the source ID to indicate that the sub-packet is associated with the first packet, and wherein the packet ID is generated per application or per server.

20. The non-transitory computer-readable medium of claim 17, wherein the one or more instructions, that cause the device to perform the reassembly of the second plurality of sub-packets, cause the device to:
generate a hash table that includes a pointer to a packet assembly table for the packet, wherein the hash table includes a key that is based on a source identifier (ID) associated with the second packet and a packet ID associated with the second packet.

* * * * *